US007747573B2

(12) United States Patent
Butt et al.

(10) Patent No.: US 7,747,573 B2
(45) Date of Patent: Jun. 29, 2010

(54) UPDATING ELEMENTS IN A DATA STORAGE FACILITY USING A PREDEFINED STATE MACHINE, WITH SERIAL ACTIVATION

(75) Inventors: Edward G. Butt, Tucson, AZ (US); Jed L. Dyreng, San Jose, CA (US); Jeffrey E. Ferrier, San Jose, CA (US); Steven D. Johnson, Tucson, AZ (US); David N. Mora, San Jose, CA (US); Tony J. Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1482 days.

(21) Appl. No.: 10/992,157

(22) Filed: Nov. 18, 2004

(65) Prior Publication Data

US 2006/0106826 A1    May 18, 2006

(51) Int. Cl.
  *G06F 7/00*    (2006.01)
  *G06F 17/00*    (2006.01)
(52) U.S. Cl. ...................................... 707/638; 707/610
(58) Field of Classification Search ................ 707/203, 707/101, 638, 610
  See application file for complete search history.

(56) References Cited

U.S. PATENT DOCUMENTS

| | | | |
|---|---|---|---|
| 4,607,332 A | 8/1986 | Goldberg | |
| 5,253,344 A | 10/1993 | Bostick et al. | |
| 5,608,893 A | 3/1997 | Slingwine et al. | |
| 5,694,617 A | 12/1997 | Webb et al. | |
| 5,778,059 A * | 7/1998 | Loghmani et al. ........... 379/243 |
| 5,916,305 A | 6/1999 | Sikdar et al. | |
| 6,052,531 A * | 4/2000 | Waldin et al. ............... 717/170 |
| 6,079,013 A | 6/2000 | Webb et al. | |

(Continued)

FOREIGN PATENT DOCUMENTS

JP    8-256268    10/1996

(Continued)

OTHER PUBLICATIONS

U.S. Appl. No. 10/674,295, filed Sep. 29, 2003, Martens et al.

(Continued)

*Primary Examiner*—Kuen S Lu
(74) *Attorney, Agent, or Firm*—Scully, Scott, Murphy & Presser, P.C.

(57) ABSTRACT

A technique for updating elements in a data storage facility, including a single server or a multi-server system, such as by providing updated internal code packages to the elements. The update is performed using a fixed state machine, where the elements are updated in a coordinated manner within the constraints of the state machine. In a multi-server device, code packages are distributed to elements associated with the different servers in one traversal of the state machine, during distribute states of the state machine. The distributed code packages are activated in activate states of the state machine in multiple traversals of the state machine, so there is a serial activation. The code packages can be grouped in a flexible way by configuring an external update bundle used by the state machine. The distributing of the code is based on the grouping.

9 Claims, 4 Drawing Sheets

U.S. PATENT DOCUMENTS

| | | | |
|---|---|---|---|
| 6,119,219 | A | 9/2000 | Webb et al. |
| 6,205,526 | B1 | 3/2001 | Tanuma |
| 6,237,144 | B1* | 5/2001 | Delo ........................ 717/174 |
| 7,073,017 | B2 | 7/2006 | Yamamoto |
| 7,266,815 | B2 | 9/2007 | Butt et al. |
| 2002/0078222 | A1 | 6/2002 | Compas et al. |
| 2002/0112141 | A1 | 8/2002 | Greenwood et al. |
| 2002/0188740 | A1* | 12/2002 | Tang et al. .................. 709/230 |
| 2003/0011619 | A1 | 1/2003 | Jacobs et al. |
| 2003/0052919 | A1 | 3/2003 | Tlaskal et al. |
| 2003/0172135 | A1* | 9/2003 | Bobick et al. ............... 709/220 |
| 2004/0139150 | A1 | 7/2004 | McCanne et al. |
| 2004/0205776 | A1 | 10/2004 | Harrington et al. |
| 2004/0255286 | A1 | 12/2004 | Rothman et al. |
| 2005/0216530 | A1* | 9/2005 | Meller et al. ................ 707/203 |
| 2005/0289072 | A1 | 12/2005 | Sabharwal |
| 2006/0026304 | A1 | 2/2006 | Price |

FOREIGN PATENT DOCUMENTS

JP          2000-148465          5/2000

OTHER PUBLICATIONS

U.S. Appl. No. 10/674,300, filed Sep. 29, 2003, Martens et al.
Entry Point Table for Licensed Internal Code, TDB-ACC-No.: NA92098, published Sep. 1, 1992, vol. 35, issue 4A, pp. 8-10.

* cited by examiner

FIG. 3

| STATE | POWER | SERVICE PROCESSOR GROUPS | AIX | AIX-PTF | AIX-EFIX | SFI | HAs | DAs | SE | DDMs |
|---|---|---|---|---|---|---|---|---|---|---|
| S-1 | 1 | 18 | 42 | 43 | 44 | 45 | 146 | 172 | 198 | 215 |
| S-2 | 2 | 19 | 46 | 47 | 48 | 49 | 147 | 173 | 199 | 216 |
| S-3 | 3 | 20 | 50 | 51 | 52 | 53 | 148 | 174 | 200 | 217 |
| S-4 | 4 | 21 (S0,S1) | 54 (S0,S1) | 55 (S0,S1) | 56 (S0,S1) | 57 (S0,S1) | 149 (S0,S1) | 175 (S0,S1) | 201 (S0,S1) | 218 (S0,S1) |
| S-5 | 5 | 22 (S0,S1) | 58 (S0,S1) | 59 (S0,S1) | 60 (S0,S1) | 61 (S0,S1) | 150 (S0,S1) | 176 (S0,S1) | 202 (S0,S1) | 219 (S0,S1) |
| S-6 | 6 | 23 (S0,S1) | 62 (S0,S1) | 63 (S0,S1) | 64 (S0,S1) | 65 (S0,S1) | 151 (S0,S1) | 177 (S0,S1) | 203 (S0,S1) | 220 (S0,S1) |
| S-7 | 7 | 24 (S0,S1) | 66 (S0,S1) | 67 (S0,S1) | 68 (S0,S1) | 69 (S0,S1) | 152 (S0,S1) | 178 (S0,S1) | 204 (S0,S1) | 221 (S0,S1) |
| S-8 | 8 | 25 | 70 | 71 | 72 | 73 | 153 (S0,S1) | 179 (S0,S1) | 205 (S0,S1) | 222 (S0,S1) |
| S-9 | 9 | 26 (S0) | 74 (S0) | 75 (S0) | 76 (S0) | 77 (S0) | (HA1) 154 | (DA1) 180 | 206 | (DDM1) 223 |
| S-10 | 10 | 27 (S1) | 78 | 79 | 80 | 81 | 155 | 181 | 207 | 224 |
| S-11 | 11 | 28 | 82 | 83 | 84 | 85 | 156 | 182 | 208 | 225 |
| S-12 | 12 | 29 | 86 | 87 | 88 | 89 | 157 | 183 | 209 | 226 |
| S-13 | 13 | 30 | 90 | 91 | 92 | 93 | 158 | 184 | 210 | 227 |
| S-14 | 14 | 31 | 94 | 95 | 96 | 97 | 159 | 185 | 211 | 228 |
| S-15 | 15 | 32 | 98 | 99 | 100 | 101 | 160 | 186 | 212 | 229 |
| S-16 | 16 | 33 | 102 | 103 | 104 | 105 | 161 | 187 | 213 | 230 |
| S-17 | 17 | 34 | 106 | 107 | 108 | 109 | 162 | 188 | 214 | 231 |

Additional rows (continuation at bottom):

| | | | | 110 | 111 | 112 | 113 | (HA2) 163 | (DA2) 189 | | (DDM2) 232 |
| | | | | 114 | 115 | 116 | 117 | 164 | 190 | | 233 |
| | | | | 118 | 119 | 120 | 121 | 165 | 191 | | 234 |
| | | | | 122 | 123 | 124 | 125 | 166 | 192 | | 235 |
| | | | | 126 | 127 | 128 | 129 | 167 | 193 | | 236 |
| | | | | 130 | 131 | 132 | 133 | 168 | 194 | | 237 |
| | | | | 134 | 135 | 136 | 137 | 169 | 195 | | 238 |
| | | | | 138 | 139 | 140 | 141 | 170 | 196 | | 239 |
| | | | | 142 | 143 | 144 | 145 | 171 | 197 | | 240 |

UPDATING ELEMENTS IN A DATA STORAGE FACILITY USING A PREDEFINED STATE MACHINE, WITH SERIAL ACTIVATION

CROSS-REFERENCE TO RELATED APPLICATIONS

This application is related to co-pending, commonly-assigned U.S. patent application Ser. No. 10/992,176, to Y. Hsu et al., filed Nov. 18, 2004, entitled "Updating Elements In A Data Storage Facility Using A Predefined State Machine, With Parallel Activation".

BACKGROUND OF THE INVENTION

1. Field of the Invention

The invention relates generally to the field of data storage in computer systems and, more specifically, to a technique for updating elements in a multi-server data storage facility using a state machine.

2. Description of the Related Art

Storage facilities such as storage servers as commonly used by corporations and other organizations have high-capacity disk arrays to store large amounts of data from external host systems. A storage facility may also backup data from another storage facility, such as at a remote site. The IBM® Enterprise Storage Server (ESS) is an example of such a storage facility. Such facilities can access arrays of disks or other storage media to store and retrieve data. Moreover, redundant capabilities may be provided as a further safeguard against data loss. For example, a dual server system includes two separate servers that can access the same storage disks.

Moreover, storage facilities include several subsystems and components, referred to as updateable elements, each requiring its own unique update image and update commands. The elements are updated from time to time to provide new features or fix problems, for instance. Elements that may be updated include host adapters, device adapters, service processors, storage disks, power components, and so forth.

However, there is a need for greater flexibility in the update process, particularly when the update process is carried out using a fixed state machine.

BRIEF SUMMARY OF THE INVENTION

To address these and other issues, the present invention describes a technique for updating elements in a data storage facility, including a single server or a multi-server system, such as by providing updated internal code to the elements. The update is performed using a fixed state machine, where the elements are updated in a coordinated manner within the constraints of the state machine. The update includes code distribution and/or code activation. Groups of elements can be identified in a flexible way such that the code is distributed and/or activated according to the group. Additionally, the distributed code can be activated serially, one server at a time.

In one aspect, the invention provides a method for deploying computing infrastructure, includes integrating computer-readable code into a computing system comprising a data storage facility having at least a first server with an associated updateable element, and a second server with an associated updateable element, where the code in combination with the computing system is capable of coordinating update actions in the storage facility by performing a method. The method includes setting a sequence for distributing a plurality of code packages to the associated updateable elements of the first and second servers according to different states of a fixed state machine, wherein the states are traversed in sequence, and include at least one distribute state for distributing at least a portion of the plurality of code packages, and distributing the at least a portion of the plurality of code packages to the updateable elements of the first and second servers according to the sequence and during the at least one distribute state in a single traversal of the state machine.

In another aspect, in a method of the above-mentioned type, the state machine further includes at least one activate state for activating the at least a portion of the plurality of code packages after it is distributed to the associated updateable elements of the first and second servers. The method further includes activating, during the at least one activate state, and in the single traversal of the state machine, the at least a portion of the plurality of code packages that were distributed to the updateable element of the first server in the distributing step, and activating, during the at least one activate state, and in a subsequent traversal of the state machine, the at least a portion of the plurality of code packages that was distributed to the updateable element of the second server in the distributing step.

In another aspect, a method of the first above-mentioned type further includes grouping the associated updateable elements of the first and second servers in a group, and distributing, responsive to the grouping, at least a portion of the plurality of code packages to the updateable elements of the first and second servers according to the sequence and during the at least one distribute state in a single traversal of the state machine.

In another aspect, a method for deploying computing infrastructure includes integrating computer-readable code into a computing system comprising a data storage facility having a first server with a plurality of associated updateable elements, where the code in combination with the computing system is capable of coordinating update actions in the storage facility by performing a method. The method includes setting a sequence for distributing a plurality of code packages to the plurality of associated updateable elements according to different states of a fixed state machine, wherein the states are traversed in sequence, and include at least one distribute state for distributing at least a portion of the plurality of code packages, grouping at least two of the plurality of code packages in a group, and distributing, responsive to the grouping, the at least a portion of the plurality of code packages to the plurality of associated updateable elements in the group according to the sequence and during the at least one distribute state in a single traversal of the state machine.

Related program storage devices and data storage facility apparatuses may also be provided.

BRIEF DESCRIPTION OF THE DRAWINGS

These and other features, benefits and advantages of the present invention will become apparent by reference to the following text and figures, with like reference numbers referring to like structures across the views, wherein:

FIG. 3 illustrates a matrix showing an update process;

DETAILED DESCRIPTION OF THE INVENTION

As mentioned, from time to time it is necessary to update code used by different elements in a storage facility. Such code is commonly referred to as Licensed Maintenance Code (LMC). The Storage Facility includes several subsystems and components, referred to as updateable elements, each requiring its own unique update image and update commands.

Figure 1:
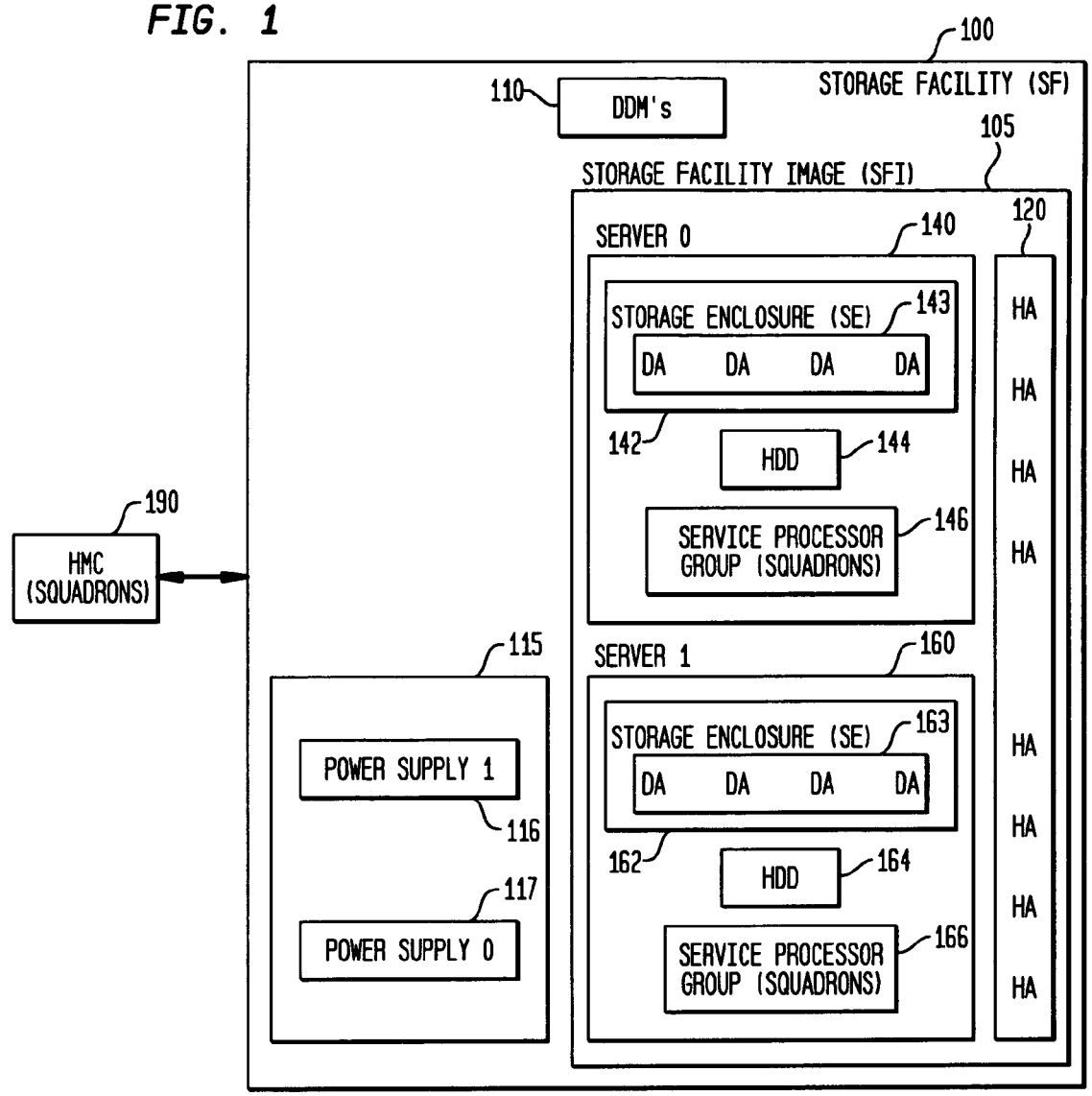
FIG. 1 illustrates a block diagram of a storage facility.

FIG. 1 illustrates a block diagram of a Storage Facility. An overall product includes a Hardware Management Console (HMC) 190, such as a laptop computer, and at least one Storage Facility (SF) 100. The example Storage Facility (SF) 100 includes at least one Storage Facility Image (SFI) 105 and a power supply group 115, which includes power supplies 116 and 117. In particular, the power supply group 115 includes a rack power control (RPC) and a primary power supply (PPS), which may be treated as one unit for the purposes of updating code. The SFI includes two servers (redundant servers) S0 (140) and S1 (160), and several disk drive modules (DDMs) 110, which are data storage devices for customer data, and several host adapters (HAs) 120. HAs are physical subunits of a storage server that provide the ability to attach to one or more host I/O interfaces. Each server 140, 160 includes at least one hard disk drive (HDD) 144, 164, also referred to as a logical partition (LPAR), at least two device adapters (DAs), 143, 163, housed in at least one storage enclosure (SE) 142, 162, and a service processor group 146, 166, respectively, (sometimes referred to as Squadrons or Computer-Electronic Complexes (CECs)). A CEC is the set of hardware facilities associated with each server 140, 160. DAs are physical components of the Storage Facility 100 that provide communication between the servers 140, 160 and the DDMs 110.

Each of the HDDs 144, 164 has an operating system running on it, such as IBM's AIX 5L operating system software, along with a driver, also referred to as SFI code. The SFI has numerous components with code for each component. The SFI code can be thought of as the main code which coordinates the activities of most of the other components and code. The invention involves, in part, updating the operating system and SFI code onto the HDDs 144, 164. The service processor groups 146, 166 and the HDDs 144, 164, respectively, combine to provide the server foundation, yet the server is incomplete without the other elements.

Typically, when a code update is needed, a technician is dispatched to the location of the Storage Facility and uses the HMC 190 to perform the updates. Alternatively, the customer may use the HMC 190 to perform the updates. Furthermore, the update may be done remotely. The HMC 190 may have the code for updating the elements stored locally, such as on a CD-ROM, or may access such code via a web site, for example. Generally, the updateable elements include the HDD 144, 164, host adapters 120, power supply component 115, DDMs 110, storage enclosures 142, 162, device adapters 143, 163, and service processor groups 146, 166.

Figure 2:
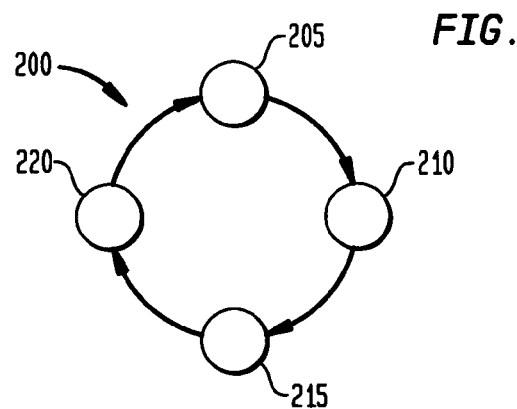
FIG. 2 illustrates a state machine for carrying out an update process.

FIG. 2 illustrates a state machine for carrying out an update process. The invention is used to coordinate the update actions for each of the updateable elements in the context of a fixed state machine that traverses different states in a fixed sequence. The traversal of the states is repeated in successive cycles or loops. For example, a simplified state machine 200 includes states 205, 210, 215 and 220, which are traversed one at a time in the sequence shown. In practice, the present invention can traverse dozens or hundreds of different states, although an action is not necessarily performed for each updateable element in each state. Each state is associated with one or more actions that are performed in updating the elements, as detailed below.

FIG. 3 illustrates a matrix showing an update process. A first column lists different states, also referred to as effectors, e.g., S-1 to S-17, as indicated in Table 1.

TABLE 1

| State: | Action: |
|---|---|
| (Packages states) | |
| S-1 | UpdatePackageSetLock |
| S-2 | UpdatePackageSetup |
| S-3 | UpdatePackagePreverify |
| S-4 | UpdatePackageDistribute |
| S-5 | UpdatePackageUnpack |
| S-6 | UpdatePackageInstall |
| S-7 | UpdatePackageCleanup |
| S-8 | UpdatePackageUnlock |
| (Activate states) | |
| S-9 | UpdateActivateSetlock |
| S-10 | UpdateActivateSetup |
| S-11 | UpdateApplicationDeactivate |
| S-12 | UpdateElementDeactivate |
| S-13 | UpdateElementInstall |
| S-14 | UpdateElementActivate |
| S-15 | UpdateApplicationActivate |
| S-16 | UpdateActivateCleanup |
| S-17 | UpdateActivateUnlock |

Note that the states shown are examples only. Generally, states S-1 to S-8 can be considered package states, relating to distribution of a code package, or at least a portion of a code package, and states S-9 to S-17 can be considered activate states, relating to the activation of a distributed code package or the portion thereof. In particular, in states S-1 and S-2, a setup action is performed. In states S-3 to S-5, an image or code is distributed to one or more elements. In state S-6, the distributed code is installed at the element. In states S-7 and S-8, post-installation actions are performed. In states S-9 and S-10, pre-activation actions are performed. In states S-11 and S-12, an element is quiesced and rebooted. In state S-13, the code at an element is installed. In states S-14 and S-15, an element is rebooted and can resume its normal operation. In states S-16 and S-17, post activation actions are performed for an element.

The remaining columns list code packages, e.g., power and service processor group code packages, HDD code packages (e.g., AIX, AIX-PTF (program temporary fix), AIX-EFIX (electronic fix), and SFI), and DA, HA, SE and DDM code packages. The cells under each code package indicate a sequence number (e.g., 1, 2, 3 . . . ). A cell with only a sequence number indicates there is no operation of the state, e.g., no action is applied relative to the code package. The notation (S0, S1) indicates the action is applied to a code package for both servers S0 and S1 (or more than two servers, if present) essentially at the same time or one after another. The notation (S0) or (S1) in the heading of a separate subcolumn indicates the action is applied to the code packages discretely for each server.

The sequence number in each cell indicates the sequence in which the actions of the states are carried out. In some cases, an action is applied to only one code package in a single state, in one traversal of the state machine. In other cases, an action is applied to multiple code packages in a single state, in one traversal of the state machine. This can be achieved by grouping that code packages, as discussed further below. The correlation between the traversals or loops of the state machines and the sequence numbers is as indicated in Table 2.

TABLE 2

| Traversal No.: | Sequence Nos.: |
| --- | --- |
| 1 | 1-17 |
| 2 | 18-34 |
| 3 | 35-41 |
| 4 | 42-109 |
| 5 | 110-145 |
| 6 | 146-162 |
| 7 | 163-171 |
| 8 | 172-188 |
| 9 | 189-197 |
| 10 | 198-214 |
| 11 | 215-231 |
| 12 | 232-240 |

As indicated in FIG. 3, one traversal of the state machine is used for applying some of the actions to one server, while in other cases, one traversal of the state machine is sued for applying some of the action to multiple servers. Furthermore, regarding the host adapters (HAs), device adapters (DAs), and the disk drive modules (DDMs), a separate traversal of the state machine is used for applying the actions in the activate states S9-S17 to each element. Two HAs, HA1 and HA2, two DAs, DA1 and DA2, and two DDMs, DDM1 and DDM2, are provided as examples. In practice there can be many more than two of these elements, in which case additional traversals of the state machine are used for each element. Note also that separate traversals are used for activating the distributed code for the HDD-related code packages (AIX, AIX-PTF, AIX-EFIX and SFI) for servers S0 (traversal #4) and S1 (traversal #5).

Alternatively, it is possible to provide code for updating the HAs as part of the SFI update. When both servers (HDDs) are rebooted, and when the server code comes up, it recognizes that there is no HA code and grabs the HA code without any additional work from the update process. In this case, it is not necessary to use the state machine to separately update the HAs. As a further alternative, it is possible to move the service processor group code in with the overall group of the AIX, AIX-PTF, AIX-EFIX and SFI code, in which case a separate traversal of the state machine is not needed for updating the service processor group code.

Generally, the product LMC update architecture follows a fixed state machine process that is typically implemented to update a single element. While it is possible to provide an implementation where a state machine is optimized to the flow of the update process, in other cases the update process must be conducted where the sequencing of the state machine from state to state is relatively fixed on a higher architectural level. The preset invention works within the confines of the fixed state machine to provide a flexible implementation where multiple element groupings and update sequences can be provided. The update sequence and order depend on the installation method and an update bundle grouping rules file, which is used by the HMC 190 to update the Storage Facility 100 with the different code packages, and which can be dynamically modified from one code load to the next. The invention provides a solution that provides flexibility within the fixed state machine's states, while also allowing the ability to loop over groups of states.

In particular, the update process can follow the predefined fixed state machine sequencing while providing the versatility to act on multiple elements within a given state as prescribed by a grouping scheme provided in the dynamic update bundle. A mechanism is provided to resequence through, or repeat, sets of states for multiple elements based on a grouping scheme provided in the dynamic update bundle. An advantage of the invention is therefore that it provides a way to update multiple elements within the architecture of a more restrictive single element state machine process. The invention also provides a way to dynamically change the element update order and the element update groupings by changing their group and sequence identifiers in the update bundle rather than changing the code that does the update, thereby providing flexibility without changing code. The invention also provides a way to correctly sequence through a list of updateable elements even when one or more of the updateable elements are removed from the update bundle by some arbitrary means.

In particular, the update process is designed to update all of the updateable elements. However, if the user or some other process decides to update a subset of those elements, then the update process will update only that subset of elements. This may be achieved by the user by deselecting the elements from the displayed updateable element list at the beginning of the update process, or it may be accomplished by excluding the specific updateable elements from a Release Bundle. The Release Bundle is a file that contains a list of all of the updateable packages for a specific code release. A modified Release Bundle, or Update Bundle, contains a list of the packages that will be updated for the specific update process. The state machine will sequentially go through the Update Bundle and apply the packages from the Update Bundle to the corresponding updateable elements.

Furthermore, the invention provides a way to separate the updates on updateable elements by cluster, e.g., server, resource, a process that ensures that specific multiple cluster resources are not updated at the same time, even though parts of their updates may occur simultaneously.

The invention operates within the context of a fixed state machine and can include the following objects or attributes:

a. Update Bundle Rules File
  ii. Element Update Sequence (order)—defined by placement order in update bundle
  iii. Element Update Groupings
b. Code to extract the Update Bundle information
c. Code to sequence through the state machine and properly call update methods for each Element based on the Element, Group.
d. Code to execute the specific update methods for each updateable element.

The following Update Bundle (Table 3) provides an example of how the invention can be implemented.

TABLE 3

Sample Update Bundle:

| Update Package | Group |
| --- | --- |
| Pkg1 | A |
| Pkg2 | A |
| Pkg3 | B |
| Pkg4 | B |
| Pkg5 | B |
| Pkg6 | B |
| Pkg7 | C |
| Pkg8 | C |

The update bundle specifies the order in which specific update packages should be applied to the various updateable elements within the Storage Facility in the left-most column, "Update Packages", the order being from top to bottom. The package names are chosen for illustrative purposes only. The Group assignments are specified in the second column, "Group". For example, Pkg1 and Pkg2 are in update group "A". Each package may be associated with a Group, and each Group may have one or more Update Package members.

The state machine executes its states sequentially for each Group. After completing states 1-N for Group A, where N is the number of states, the state machine repeats states 1-N for Group B, and so forth for the other groups. For each updateable element in a group, the packages can be operated on sequentially for the updateable element. For example, for state 1, Pkg3 can be operated on for the updateable element, followed by Pkg4, then Pkg5, and finally Pkg6. For state 2, Pkg3 is operated on for the updateable element, followed by Pkg4, then Pkg5, and finally Pkg6, and so forth for the other states.

Generally, to sequentially update multiple elements within a Group, all of the states are executed against the code packages and/or elements defined by the group. Then, after a successful completion, all of the states are executed against another subset of the code packages and/or elements, and so forth until all updateable elements are updated. Note that the states are sometimes executed against a package, as in the distribute states of the state machine, and, at other times, the state machine targets the updateable elements and its corresponding packages or just the updateable elements.

Moreover, the process may be considered to be a concurrent update process since at least one server is always fully functional. That is, the Storage Facility Image 105 can be thought of as a black box that is always operational and, from a customer perspective, the I/O operations are available 100% of the time, typically with minimal throughput degradation. So, a concurrent update may remove a group of updateable elements from operation while they are being updated, but the complementary group on the other server is still operational. For example, only one HDD will be rebooted at a time.

Figure 4:
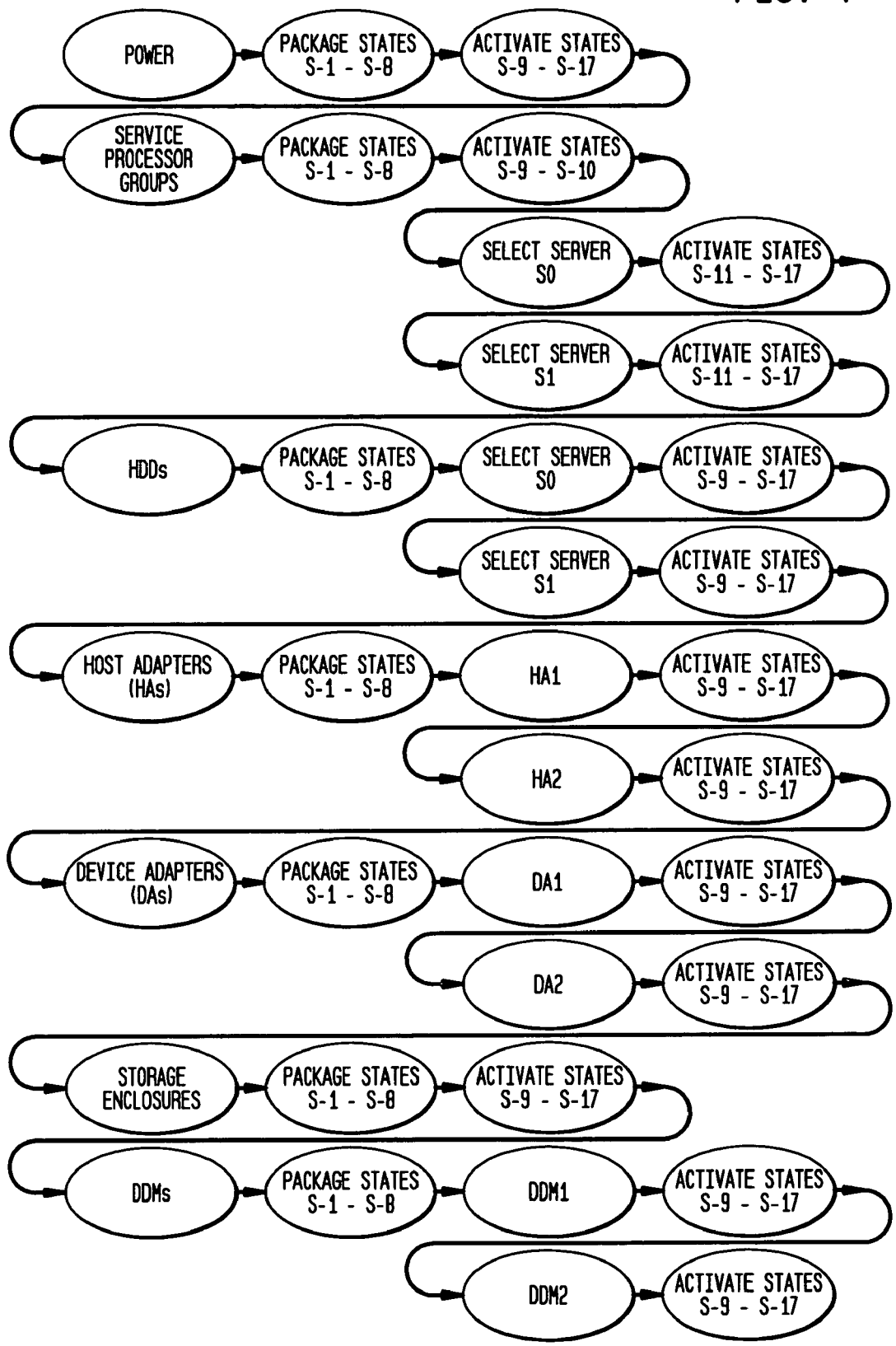
FIG. 4 illustrates an update flow process.

FIG. 4 illustrates an update flow process. The flow process of FIG. 4 provides a summary of the information presented in FIG. 3, but with reference to the physical updateable elements rather than the code packages. As mentioned, states S-1 to S-8 can be considered package states, relating to distribution of a code package, and states S-9 to S-17 can be considered activate states, relating to the activation of a distributed code package. The power component is the first element that is updated. The package states are traversed for the power component, and then the activate states. The service processor groups are processed next. The package states are traversed, and then the activate states S-9 to S-10. The first server S0 is selected, then the activate states S-11 to S-17 are traversed for S0. Next, the second server S1 is selected, then the activate states S-11 to S-17 are traversed for S1. The process can be repeated accordingly for additional servers. The HDDs are processed next. The package states are traversed, the first server S0 is selected, then the activate states are traversed for S0. Next, the second server S1 is selected, then the activate states are traversed for S1. The process can be repeated accordingly for additional servers. Further details regarding the activate states for the HDD are provided in FIG. 5.

The HAs are processed next. The package states are traversed, the first HA (HA1) is selected, then the activate states are traversed. Next, the second HA (HA2) is selected, then the activate states are traversed. The process can be repeated accordingly for additional HAs. The DAs are processed next. The package states are traversed, the first DA (DA1) is selected, then the activate states are traversed. Next, the second DA (DA2) is selected, then the activate states are traversed. The process can be repeated accordingly for additional DAs.

The storage enclosures are processed next. The package states are traversed, then the activate states are traversed. The DDMs are processed next. The package states are traversed, the first DDM (DDM1) is selected, then the activate states are traversed. Next, the second DDM (DDM2) is selected, then the activate states are traversed. The process can be repeated accordingly for additional DDMs.

Figure 5:
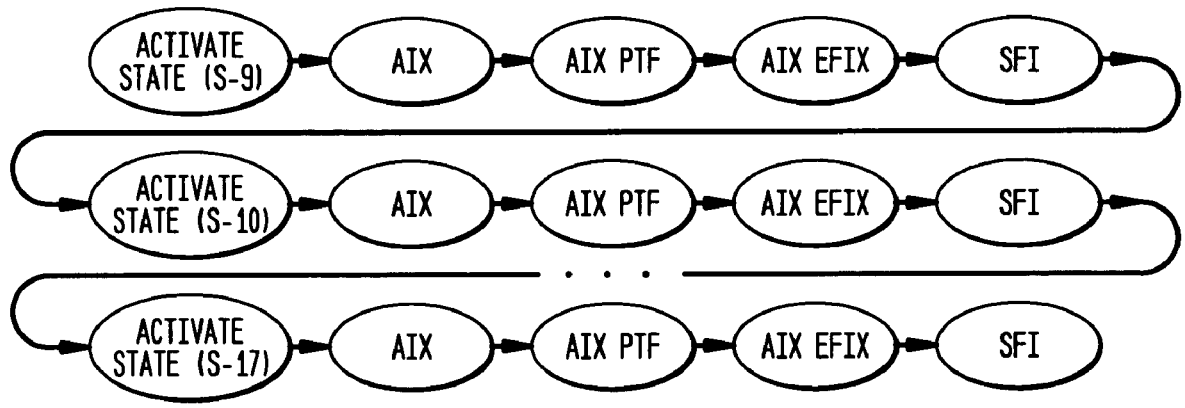
FIG. 5 illustrates activation states for the update flow process of FIG. 4 for a server.

FIG. 5 illustrates activation states for the update flow process of FIG. 4 for a server. In particular, FIG. 5 provides further details regarding the activate states for the HDDs. The process shown is the same for the HDD of each server, and represents the details of the actions referred to by the notation "Activate states S-9 to S-17" for S0 and S1 in FIG. 4. Recalling that states S-9 to S-17 are considered activate states, the actions of the first of these states (S-9) is carried out to activate the code package for AIX, then the code package for AIX PTF, then the code package for AIX EFIX, and then the code package for the SFI. The actions of the next state (S-10) are then carried out to activate the code package for AIX, then the code package for AIX PTF, then the code package for AIX EFIX, and then the code package for the SFI. The process is repeatedly accordingly until the last activate state (S-17) is reached. Again, the actions of the state S-17 are carried out to activate the code package for AIX, then the code package for AIX PTF, then the code package for AIX EFIX, and then the code package for the SFI, thereby completing the activation of the HDD. The process of FIG. 5 is subsequently repeated to activate the HDD of the next server.

Accordingly, it can be seen that the invention provides a technique for distributing code packages to two (or theoretically more) servers on one pass through the distribute portion of a state machine. The activation can be performed on one server per single pass through the activate portion of the state machine. The process loops over the activate portion of the state machine—one loop for each server—so that the servers are activated serially to maintain customer service. That is, only one server is taken out of service at a time. However, the process can be carried out on a single server as well. The elements and/or code packages can be grouped in a dynamically updateable manner to control the sequence of code distribution and activation.

Note that the invention described herein may be deployed on an existing or new computing infrastructure, such as a data storage facility, by integrating computer-readable code into the storage facility, where the code in combination with the storage facility is capable of performing a method for achieving the functionality described herein.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for deploying computing infrastructure, comprising integrating computer-readable code into a computing system comprising a data storage facility having at least a first server with an associated updateable element, and a second server with an associated updateable element, where the code in combination with the computing system is capable of coordinating update actions in the storage facility by performing a method comprising:

setting a sequence for distributing a plurality of code packages to the associated updateable elements of the first and second servers according to different states of a fixed state machine;

wherein the states are traversed in sequence, and include at least one distribute state for distributing at least a portion of the plurality of code packages; and distributing the at least a portion of the plurality of code packages to the updateable elements of the first and second servers according to the sequence and during the at least one distribute state in a single traversal of the state machine;

wherein each state of the fixed state machine is associated with one or more actions that are performed in updating an updateable element and the different states of the fixed state machine are traversed in a fixed sequence, and wherein one or more of the plurality of code packages include dynamically modifiable update sequence.

2. The method of claim 1, wherein:

the states include at least one activate state for activating the plurality of code packages after they are distributed to the associated updateable elements of the first and second servers; and the method further comprises:

activating, during the at least one activate state, and in the single traversal of the state machine, the at least a portion of the plurality of code packages that was distributed to the updateable element of the first server in the distributing step; and activating, during the at least one activate state, and in a subsequent traversal of the state machine, the at least a portion of the plurality of code packages that was distributed to the updateable element of the second server in the distributing step.

3. The method of claim 1, further comprising:

grouping at least two of the plurality of code packages;

wherein the distributing is responsive to the grouping.

4. The method of claim 3, wherein:

the grouping is achieved by configuring an external update bundle used by the state machine.

5. The method of claim 1, wherein:

the associated updateable elements of the first and second servers comprise at least one of: a power supply component, a hard disk drive, a storage facility image, a host adapter, a device adapter, a storage enclosure, and a disk drive module.

6. The method of claim 1, wherein:

the associated updateable elements of the first and second servers comprise hard disk drives, and the plurality of code packages comprise operating system code for use by the hard disk drives.

7. At least one program storage device tangibly embodying a program of instructions executable by at least one processor to perform a method for coordinating update actions in a storage facility having at least a first server with an associated updateable element, and a second server with an associated updateable element, the method comprising:

setting a sequence for distributing a plurality of code packages to the associated updateable elements of the first and second servers according to different states of a fixed state machine;

wherein the states are traversed in sequence, and include at least one distribute state for distributing at least a portion of the plurality of code packages; and distributing the at least a portion of the plurality of code packages to the updateable elements of the first and second servers according to the sequence and during the at least one distribute state in a single traversal of the state machine;

wherein each state of the fixed state machine is associated with one or more actions that are performed in updating an updateable element and the different states of the fixed state machine are traversed in a fixed sequence, and wherein one or more of the plurality of code packages include dynamically modifiable update sequence.

8. The at least one program storage device of claim 7, wherein:

the associated updateable elements of the first and second servers comprise at least one of: a power supply component, a hard disk drive, a storage facility image, a host adapter, a device adapter, a storage enclosure, and a disk drive module.

9. The at least one program storage device of claim 7, wherein:

the associated updateable elements of the first and second servers comprise hard disk drives, and the plurality of code packages comprise operating system code for use by the hard disk drives.

* * * * *